3,116,286
Patented Dec. 31, 1963

3,116,286
NITROSOSULFANILAMIDES AND METHODS OF PREPARING THE SAME
William B. Wright, Jr., Woodcliff Lake, N.J., and Sidney Goldstein, Spring Valley, and Herbert J. Brabander, Pearl River, N.Y., assignors to American Cyanamid Company, New York, N.Y., a corporation of Maine
No Drawing. Filed Aug. 29, 1961, Ser. No. 134,562
8 Claims. (Cl. 260—239.5)

This invention relates to new sulfa drugs. More particularly it relates to new nitrososulfanilamides and method of preparing the same.

The development and use of sulfa drugs over the past twenty-five years is well-known. These sulfa drugs are used primarily for their activity as anti-bacterial agents. Sulfa drugs such as sulfadiazine have been in general use for at least twenty years and have been found highly effective in combating bacterial infections.

We have now found that substituted nitrososulfanilamides are active as anti-inflammatory agents. These compounds may be illustrated by the following formula:

$$\text{R-N(N=O)-}\underset{}{\bigcirc}\text{-SO}_2\text{-N}\underset{R_2}{\overset{R_1}{\diagdown}}$$

wherein R is a lower alkyl or aralkyl radical and $R_1$ and $R_2$ are members of the group consisting of hydrogen and lower alkyl radicals and when taken together with the nitrogen form a saturated heterocyclic radical.

The compounds of the present invention are, in general, crystalline solids which are relatively insoluble in water and soluble in organic solvents such as lower alkyl alkanols, acetone, tetrahydrofuran and the like. Those compounds in which the $N^1$-nitrogen is a primary amino nitrogen form metal salts in strong alkali which are generally soluble in water but insoluble in such non-polar solvents as ether, benzene, toluene and the like.

The present compounds can be prepared by reacting a sulfonamide with a nitrosating agent, preferably, in a solvent inert to the reactants. This reaction can be illustrated by the following equation:

$$\text{R-NH-}\underset{}{\bigcirc}\text{-SO}_2\text{-N}\underset{R_2}{\overset{R_1}{\diagdown}} \xrightarrow{NO_2^-}$$

$$\text{R-N(N=O)-}\underset{}{\bigcirc}\text{-SO}_2\text{-N}\underset{R_2}{\overset{R_1}{\diagdown}}$$

wheren R, $R_1$ and $R_2$ are as defined hereinbefore. In carrying out the reaction a mineral acid is usually present if best results are to be obtained. The nitrosating agents which can be used in the present process include nitrous acid, nitrosyl chloride, alkyl nitrites and the like. The reaction is preferably carried out at a temperature within the range of about 0° C. to about 20° C. although it can be carried out within a tempearture range of −10° C. to about 30° C.

The starting materials in the present process which are alkyl or aralkyl sulfonamides are well-known in the literature and are described in such references as (Northey "The Sulfonamides and Allied Compounds," Reinhold Publishing Corporation, New York, N.Y., 1948). Among the starting materials found useful in the process of the present invention are $N^4$-methylsulfanilamide, $N^4$-ethylsulfanilamide, $N^4$-propylsulfanilamide, $N^1,N^1,N^4$-trimethylsulfanilamide, $N^1,N^4$ - dimethylsulfanilamide, 1 - [p-(methylamino)phenylsulfonyl]-piperidine, 1-[p-(methylamino)-phenylsulfonyl]-pyrrolidine, 1-[p-(methylamino) phenylsulfonyl] - hexamethyleneimine, 1-[p-(methylamino)phenylsulfonyl]-morpholine, $N^4$-ethyl-$N^1,N^1$-dimethylsulfanilamide, $N^4$ - methyl - $N^1,N^1$ - diethylsulfanilamide, $N^1,N^1,N^3$-trimethylsulfanilamide, $N^4$ - benzyl - $N^1,N^1$ - dimethylsulfanilamide and the like.

When the reaction of the present invention is complete which is usually within a period of from about 10 minutes to 2 hours the desired product separates as a precipitate. This precipitate can be removed by filtration and purified by recrystallization from solvents such as lower alkyl alkanols.

The compounds of the present invention are active anti-inflammatory agents. Compounds of the present invention, such as $N^4$-methyl-$N^4$-nitrososulfanilamide, are as active as phenylbutazone, a commercially available anti-inflammatory agent. It is well-known that anti-inflammatory agents are useful in the treatment of arthritis, bursitis, burns and other collagen diseases.

The following examples illustrate in detail the preparation of representative compounds of this invention.

EXAMPLE I

Preparation of $N^4$-Methyl-$N^4$-Nitrososulfanilamide

A mixture of 18.6 parts of $N^4$-methylsulfanilamide, 500 parts of water and 20 parts by volume of concentrated hydrochloric acid is cooled by the addition of chipped ice. The reaction mixture is stirred vigorously and a solution of 7 parts of sodium nitrate in 100 parts of water is added. The reaction mixture is stirred for 15 minutes longer, and the precipitate is filtered off and washed with water. The crude product is recrystallized from ethanol and $N^4$-methyl-$N^4$-nitrososulfanilamide, melting point 144–145° C., is obtained.

EXAMPLE II

Preparation of $N^4$-Ethyl-$N^4$-Nitrososulfanilamide

The above compound having a melting point of 112–114° C. is obtained by substituting $N^4$-ethylsulfanilamide for $N^4$-methylsulfanilamide in the procedure of Example I.

EXAMPLE III

Preparation of $N^4$-Propyl-$N^4$-Nitrososulfanilamide

The above compound which melts at 113–114° C. is obtained by substituting $N^4$-propylsulfanilamide in the process described in Example I.

EXAMPLE IV

Preparation of $N^4$-Benzyl-$N^1,N^1$-Dimethyl-$N^4$-Nitrososulfanilamide

The above compound is obtained by substituting $N^4$-benzyl-$N^1,N^1$-dimethylsulfanilamide for $N^4$-methylsulfanilamide in the procedure described in Example I.

EXAMPLE V

Preparation of $N^4$-Nitroso-$N^4$-Phenethylsulfanilamide

The above compound is obtained when $N^4$-phenethylsulfanilamide is substituted for $N^4$-methylsulfanilamide in the procedure described in Example I.

EXAMPLE VI

Preparation of $N^1,N^1,N^4$-Trimethyl-$N^4$-Nitrososulfanilamide

The above compound having a melting point of 131–133° C. is obtained when $N^1,N^1,N^4$-trimethylsulfanilamide is substituted for $N^4$-methylsulfanilamide in the procedure of Example I.

EXAMPLE VII

Preparation of $N^1,N^1,N^3$-Trimethyl-$N^3$-Nitrososulfanilamide

The above compound is obtained when $N^1,N^1,N^3$-trimethylsulfanilamide is substituted for $N^4$-methylsulfanilamide in the procedure of Example I.

EXAMPLE VIII

*Preparation of $N^1,N^4$-Dimethyl-$N^4$-Nitrososulfanilamide*

The above compound which has a melting point of 114–115° C. is obtained by substituting $N^1,N^4$-dimethylsulfanilamide for $N^4$-methylsulfanilamide in the procedure described in Example I.

EXAMPLE IX

*Preparation of 1-[p-(Methylnitrosamino)Phenylsulfonyl] Pyrrolidine*

The above compound is obtained when 1-[p-(methylamino)phenylsulfonyl]-pyrrolidine is substituted for $N^4$-methylsulfanilamide in the procedure of Example I.

EXAMPLE X

*Preparation of 1-[p-(Methylnitrosamino)Phenylsulfonyl] Piperidine*

The above compound, having a melting point of 161–163° C., is obtained when 1-[p-(methylamino)phenylsulfonyl]-piperidine is substituted for $N^4$-methylsulfanilamide in the procedure outlined in Example I.

EXAMPLE XI

*Preparation of 1-[p-(Methylnitrosamino)Phenylsulfonyl] Hexamethyleneimine*

The above compound is obtained when 1-[p-(methylamino)phenylsulfonyl]-hexamethyleneimine is substituted for $N^4$-methylsulfanilamide in the process described in Example I.

EXAMPLE XII

*Preparation of 4-[p-(Methylnitrosamino)Phenylsulfonyl] Morpholine*

The above compound is obtained when 4-[p-(methylamino)phenylsulfonyl]morpholine is substituted for $N^4$-methylsulfanilamide in the procedure of Example I.

EXAMPLE XIII

*Preparation of $N^4$-Ethyl-$N^1,N^1$-Dimethyl-$N^4$-Nitrososulfanilamide*

The above compound, melting at 112–114° C., is obtained when $N^4$-ethyl-$N^1,N^1$-dimethylsulfanilamide is substituted for $N^4$-methylsulfanilamide in the procedure of Example I.

We claim:

1. Compounds of the formula:

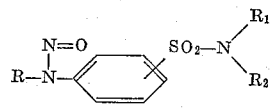

wherein R is a member of the group consisting of lower alkyl and aralkyl and $R_1$ and $R_2$ are members of the group consisting of hydrogen and lower alkyl and when taken together with the nitrogen form a saturated heterocyclic radical selected from the group consisting of pyrrolidinyl, piperidinyl, hexamethyleneimino and morpholino.

2. The compound $N^4$-methyl-$N^4$-nitrososulfanilamide.
3. The compound $N^4$-ethyl-$N^4$-nitrososulfanilamide.
4. The compound $N^4$-propyl-$N^4$-nitrososulfanilamide.
5. The compound $N^1,N^1,N^4$-trimethyl-$N^4$-nitrososulfanilamide.
6. The compound $N^1,N^4$-dimethyl-$N^4$-nitrososulfanilamide.
7. The compound 1-[p-(methylnitrosamino)phenylsulfonyl]-piperidine.
8. The compound $N^4$-ethyl-$N^1,N^1$-dimethyl-$N^4$-nitrososulfanilamide.

References Cited in the file of this patent

UNITED STATES PATENTS 2,960,481  Sullivan _____ Nov. 15, 1960

OTHER REFERENCES

Northey: The Sulfonamides and Allied Compounds, by Reinhold Publishing Corp., pages 250–252 (1948).